(12) United States Patent
Saito et al.

(10) Patent No.: US 9,799,870 B2
(45) Date of Patent: Oct. 24, 2017

(54) MULTILAYERED MICROPOROUS POLYOLEFIN FILM

(71) Applicant: Toray Battery Separator Film Co., Ltd., Nasushiobara-shi (JP)

(72) Inventors: Toshiya Saito, Nasushiobara (JP); Kazuhiro Yamada, Nasushiobara (JP); Shintaro Kikuchi, Nasushiobara (JP)

(73) Assignee: Toray Industries, Inc. (JP)

( * ) Notice: Subject to any disclaimer, the term of this patent is extended or adjusted under 35 U.S.C. 154(b) by 107 days.

(21) Appl. No.: 14/384,014

(22) PCT Filed: Mar. 18, 2013

(86) PCT No.: PCT/JP2013/057611
§ 371 (c)(1),
(2) Date: Sep. 9, 2014

(87) PCT Pub. No.: WO2013/146403
PCT Pub. Date: Oct. 3, 2013

(65) Prior Publication Data
US 2015/0037653 A1 Feb. 5, 2015

(30) Foreign Application Priority Data

Mar. 30, 2012 (JP) ................................. 2012-080033

(51) Int. Cl.
| | |
|---|---|
| *H01M 2/16* | (2006.01) |
| *B32B 27/32* | (2006.01) |
| *B01D 67/00* | (2006.01) |
| *B01D 71/26* | (2006.01) |
| *B32B 27/08* | (2006.01) |
| *B01D 69/12* | (2006.01) |
| *H01M 10/0525* | (2010.01) |
| *H01M 2/14* | (2006.01) |

(52) U.S. Cl.
CPC ........ *H01M 2/1686* (2013.01); *B01D 67/002* (2013.01); *B01D 67/0027* (2013.01); *B01D 69/12* (2013.01); *B01D 71/26* (2013.01); *B32B 27/08* (2013.01); *B32B 27/32* (2013.01); *H01M 2/1653* (2013.01); *B32B 2307/20* (2013.01); *B32B 2307/581* (2013.01); *B32B 2307/724* (2013.01); *B32B 2307/746* (2013.01); *B32B 2457/10* (2013.01); *H01M 2/145* (2013.01); *H01M 10/0525* (2013.01)

(58) Field of Classification Search
CPC .. B01D 67/002; B01D 67/0027; B01D 69/12; B01D 71/26; B32B 2307/20; B32B 2307/581; B32B 2307/724; B32B 2307/746; B32B 2457/10; B32B 27/08; B32B 27/32; H01M 10/0525; H01M 2/145; H01M 2/16; H01M 2/1653; H01M 2/1686

See application file for complete search history.

(56) References Cited

U.S. PATENT DOCUMENTS

| | | | | |
|---|---|---|---|---|
| 2009/0117453 | A1* | 5/2009 | Kikuchi | .................. B32B 27/32 429/145 |
| 2010/0003591 | A1* | 1/2010 | Takita | ..................... B32B 27/32 429/145 |
| 2013/0045412 | A1* | 2/2013 | Takita | ................ B01D 67/0027 429/145 |

FOREIGN PATENT DOCUMENTS

| | | |
|---|---|---|
| EP | 1 900 514 | 3/2008 |
| JP | 2010-245028 | 10/2010 |
| WO | 2011/086823 | 7/2011 |

OTHER PUBLICATIONS

Supplementary European Search Report dated Sep. 30, 2015 of corresponding European Application No. 13767642.5.

* cited by examiner

*Primary Examiner* — Carlos Barcena
(74) *Attorney, Agent, or Firm* — DLA Piper LLP (US)

(57) ABSTRACT

A polyolefin multilayer microporous membrane includes at least first microporous layers which form both surface layers of the membrane and at least a second microporous layer disposed between the both surface layers, wherein static friction coefficient of one of the surface layers of the polyolefin multilayer microporous membrane against another surface layer in a longitudinal direction (MD) is 1.1 or less, and wherein pore density calculated from an average pore radius measured by mercury porosimetry method and porosity, according to Formula (1) is 4 or more:

$$\text{Pore density} = (P/A^3) \times 10^4 \quad (1)$$

wherein A represents the average pore radius (nm) measured by mercury porosimetry method and P represents the porosity (%).

6 Claims, No Drawings

MULTILAYERED MICROPOROUS POLYOLEFIN FILM

TECHNICAL FIELD

The present invention relates to a polyolefin multilayer microporous membrane. More specifically, the present invention relates to a polyolefin multilayer microporous membrane having improved slip characteristics due to a low static friction coefficient and having dense micropores, and to a method for producing the same.

BACKGROUND ART

Microporous membranes can be used, for example, as battery separators in lithium primary batteries and secondary batteries, lithium polymer batteries, nickel-metal hydride batteries, nickel-cadmium batteries, nickel-zinc batteries, silver-zinc secondary batteries and the like. Various properties are required when the microporous membrane is used as a battery separator, particularly as a lithium-ion battery separator. These requirements include excellent slip characteristics due to a low friction coefficient between membranes, and high durability of the microporous membrane having a dense microporous structure. With respect to the former, a high friction coefficient causes to generate peeling charge when the membrane is unwinded from a roll state, resulting in a deterioration of handling and also in discomfort during operation due to electro-static sticking of the membrane to surrounding devices, apparatus and the like. Further, if foreign substances adhered to the membrane by static electricity are taken inside the battery, it is concerned that pinholes may occur. With respect to the latter, for example, it leads to decreasing the probability of occurrence of short-circuit, even in cases where a voltage is applied to the right surface and the back surface of the membrane within a battery. In this case, air permeability usually becomes worse due to densification of micropores, but it is desirable that the above described performance is exhibited while maintaining a certain range of air permeability. In addition, since foreign substances adhered to the surface of the membrane can also cause the occurrence of short-circuit, it is desirable that the membrane has a surface to which foreign substances are not easily adhered, that is, a surface having good slip characteristics, and has a dense micropore structure, in order to increase the breakdown voltage of the membrane.

However, there are very few prior art documents regarding the surface slip characteristics and the micropore density of microporous membranes.

PRIOR ART DOCUMENTS

Patent Documents

For example, Patent Document 1 discloses a polyolefin microporous membrane, whose dynamic friction coefficient is specified, use of the polyolefin microporous membrane as a separator capable of providing safety, good cycle characteristics and good winding properties of the microporous membrane at the same time.

Further, Patent Document 2 discloses a method for producing a microporous membrane capable of achieving a low air permeability and a high breakdown voltage at the same time, using a material composition containing a polyolefin resin, a filler and a plasticizer.
Patent Document 1: JP 2010-202828 A
Patent Document 2: JP 2010-202829 A

SUMMARY OF THE INVENTION

Problems to be Solved by the Invention

In Patent Document 1, the micropore structure of the polyolefin microporous membrane described therein has not been focused.

The microporous membrane described in Patent Document 2 has a large membrane thickness, and is insufficient as a separator.

Accordingly, an object of the present invention is to provide a polyolefin multilayer microporous membrane having a high permeability while having good slip characteristics between membranes and a dense microporous structure.

Means for Solving the Problems

To solve the problems described above, the polyolefin microporous membrane of the present invention has the following constitution:
That is, a polyolefin multilayer microporous membrane comprising: at least first microporous layers which form both surface layers and at least a second microporous layer disposed between the both surface layers, wherein the static friction coefficient of one of the surface layers of the polyolefin multilayer microporous membrane against the other surface layer in longitudinal direction (MD) is 1.1 or less, and wherein the pore density calculated from the average pore radius measured by mercury porosimetry method and the porosity, according to the formula below is 4 or more:

Pore density=$(P/A^3) \times 10^4$ wherein A represents the average pore radius (nm) measured by mercury porosimetry method and P represents the porosity (%).

The polyolefin multilayer microporous membrane of the present invention preferably has a breakdown voltage of 1.4 kV/11.5 μm or more, and an air permeability of 250 seconds/100 cc or less.

The polyolefin multilayer microporous membrane of the present invention preferably has an electrochemical stability of 65 mAh or less.

In the polyolefin multilayer microporous membrane of the present invention, the second microporous layer preferably contains 35% by weight or more of ultra high molecular weight polyethylene.

In the polyolefin multilayer microporous membrane of the present invention, the first microporous layers preferably contain 5% by weight or more of polypropylene.

In the polyolefin multilayer microporous membrane of the present invention, the first microporous layers preferably contain 10% by weight or less of ultra high molecular weight polyethylene, and the second microporous layer preferably contains 35% by weight or more of ultra high molecular weight polyethylene.

Effects of the Invention

The polyolefin multilayer microporous membrane of the present invention has good slip characteristics between membranes due to a static friction coefficient of not more than a specific value, and a high durability due to a dense microporous structure. When the polyolefin multilayer microporous membrane of the present invention is used as a battery separator, a battery having an excellent handleability in battery production facilities, an improved quality, and an excellent safety and durability can be obtained.

MODE FOR CARRYING OUT THE INVENTION

The polyolefin multilayer microporous membrane of the present invention comprises at least first microporous layers composed of a first polyolefin, and a second microporous layer composed of a second polyolefin. The polyolefin multilayer microporous membrane has a structure of at least three layers or more, and has the first microporous layers as both surface layers, and has at least one second microporous layer between the both surface layers.

[1] Materials and Composition of the Polyolefin Multilayer Microporous Membrane (A) Polyolefin Materials As the first polyolefin which forms the first microporous layers (both surface layers) and the second polyolefin which forms the second microporous layer (a layer(s) constituting the layer(s) other than surface layers in a structure having three or more layers) of the polyolefin multilayer microporous membrane, (1) ultra high molecular weight polyethylene having a weight average molecular weight (Mw) of $1 \times 10^6$ or more, (2) polyethylene or (3) polypropylene, used alone or as a mixture, is preferred, but not specifically limited thereto. These polyolefins will be described in detail below.

(1) Ultra High Molecular Weight Polyethylene (UHMWPE)

The ultra high molecular weight polyethylene has a Mw of $1 \times 10^6$ or more. The ultra high molecular weight polyethylene may be not only a homopolymer of ethylene, but also an ethylene-α-olefin copolymer containing a small amount of another α-olefin(s). Preferred examples of the α-olefin other than ethylene include propylene, butene-1, pentene-1, hexene-1,4-methylpentene-1, octene-1, vinyl acetate, methyl methacrylate and styrene. The content of the α-olefin(s) other than ethylene is preferably 5 mol % or less. The Mw of ultra high molecular weight polyethylene is preferably from $1 \times 10^6$ to $15 \times 10^6$, more preferably from $1 \times 10^6$ to $5 \times 10^6$, particularly preferably from $1 \times 10^6$ to $3 \times 10^6$.

(2) Polyethylene

Examples of polyethylenes include high density polyethylene (HDPE), medium density polyethylene (MDPE), low density polyethylene (LDPE) and chain low density polyethylene (LLDPE). HDPE is preferred, but not limited thereto. Such a polyethylene may be not only a homopolymer of ethylene, but also a copolymer containing a small amount of another α-olefin(s) Preferred examples of the α-olefin include, propylene, butene-1, pentene-1, hexene-1, 4-methylpentene-1, octene-1, vinyl acetate, methyl methacrylate and styrene. The content of the α-olefin(s) other than ethylene is preferably 5 mol % or less. The polyethylene may be a single substance or a composition of 2 or more types of polyethylenes.

As the polyethylene composition, a composition of two or more types of HDPEs having different Mws, a similar composition of MDPEs, a similar composition of LDPEs, or a similar composition of LLDPEs may be used. A mixed composition of two or more types of polyethylenes selected from the group consisting of HDPEs, MDPEs, LDPEs, and LLDPEs may also be used. The composition may be a dry-blended product or a multistage polymerization product of two or more types of different polyethylenes.

The weight average molecular weight (Mw) of the polyethylene is usually from $1 \times 10^4$ to $1 \times 10^7$, preferably from $1 \times 10^5$ to $5 \times 10^6$, but not specifically limited thereto. The ratio of the Mw and the number average molecular weight (Mn), Mw/Mn (molecular weight distribution), is preferably within the range of 5 to 300, more preferably within the range of 6 to 100, but not specifically limited thereto. A Mw/Mn within this preferred range results in a simplified extrusion of the polyolefin solution and an excellent strength of the resulting microporous membrane. The Mw/Mn is used as a measure of the molecular weight distribution, and higher values correspond to wider molecular weight distributions. Specifically, in cases where the polyolefin is composed of a single substance, the Mw/Mn represents the breadth of its molecular weight distribution, and higher values correspond to wider molecular weight distributions. The Mw/Mn of the polyolefin composed of a single substance can be appropriately adjusted by preparing the polyolefin by multistage polymerization. A preferred multistage polymerization method is two-stage polymerization in which high molecular weight components are polymerized in the first stage, and low molecular weight components are polymerized in the second stage, or vice versa. In cases where the polyolefin is a composition, the higher the Mw/Mn, the larger the difference between the Mws of individual components contained, while the lower the Mw/Mn, the smaller the difference between the Mws. The Mw/Mn of the polyolefin composition can be appropriately adjusted by controlling the molecular weight and the mixing ratio of each component.

(3) Polypropylene (PP)

The polypropylene may either be a homopolymer or a copolymer with another olefin(s), but a homopolymer is preferred. The copolymer may either be a random copolymer or a block copolymer. Examples of the olefin other than propylene include α-olefins such as ethylene, butene-1, pentene-1, hexene-1,4-methylpentene-1, octene-1, vinyl acetate, methyl methacrylate and styrene; and diolefins such as butadiene, 1,5-hexadiene, 1,7-octadiene, and 1,9-decadiene. There are no limitations on the ratio of the other olefin(s) in the propylene copolymer as long as physical properties such as heat resistance, compression resistance and heat shrinkage resistance do not become worse. Specifically, the ratio of less than 10 mol % is preferred.

The weight average molecular weight (Mw) of the polypropylene is preferably from $1 \times 10^4$ to $4 \times 10^6$, more preferably from $3 \times 10^5$ to $3 \times 10^6$. The molecular weight distribution (Mw/Mn) of the polypropylene is preferably from 1.01 to 100, more preferably from 1.1 to 50.

(4) Other Polyolefins

The first and the second polyolefins may contain, as a component(s) other than those described above, at least one type selected from the group consisting of (a) polybutene-1, polypentene-1, poly4-methylpentene-1, polyhexene-1, polyoctene-1, polyvinyl acetate, polymethyl methacrylate, polystyrene and ethylene-α-olefin copolymer, having a Mw of from $1 \times 10^4$ to $4 \times 10^6$; and (b) polyethylene wax having a Mw of from $1 \times 10^3$ to $1 \times 10^4$, to the extent that the performance of the multilayer microporous membrane does not become worse. The polybutene-1, polypentene-1, poly4-methylpentene-1, polyhexene-1, polyoctene-1, polyvinyl acetate, polymethyl methacrylate and polystyrene may be a homopolymer or a copolymer containing another α-olefin(s).

(B) Preferable Polyolefin Composition

The materials used for the first polyolefin which forms the first microporous layers (both surface layers) and the second polyolefin which forms the second microporous layer (a layer(s) constituting the layer(s) other than both surface layers in a structure having three or more layers) of the polyolefin multilayer microporous membrane are as described above, and the polyolefins constituting individual layers are preferably as follows.

In cases where UHMWPE is mixed to the first polyolefin, the content of UHMWPE is preferably 10% by weight or less, in order to provide good slip characteristics. The content of UHMWPE is more preferably 5% by weight or less.

In cases where PP is mixed, its content is preferably 5% by weight or more, more preferably 10% by weight or more. An excellent electrochemical stability can be obtained by mixing 5% by weight or more of PP to the first polyolefin.

The second polyolefin has a large effect on the mechanical properties, gas permeability, breakdown voltage and the like of the overall membrane, since it exists inside the multilayer microporous membrane. Therefore, in cases where the content of UHMWPE is 35% by weight or more, a dense microporous structure is provided; the breakdown voltage per unit thickness is improved while exhibiting a relatively high permeability; and durability and safety when used as a battery separator are secured.

[2] Production Methods of Polyolefin Multilayer Microporous Membrane (A) First Production Method The first production method of the polyolefin multilayer microporous membrane comprises the steps of: (1-1) melt blending a first polyolefin and a membrane-forming solvent to prepare a first polyolefin solution; (1-2) melt blending a second polyolefin and a membrane-forming solvent to prepare a second polyolefin solution; (1-3) extruding the first and the second polyolefin solutions simultaneously through one die; (1-4) cooling the resulting extruded molding to form a gel-like laminated sheet; (1-5) stretching the gel-like laminated sheet at least uniaxially (first stretching); (1-6) removing the membrane-forming solvent from the gel-like laminated sheet; (1-7) drying the resulting laminated membrane; and (1-8) re-stretching the resulting dried laminated microporous membrane at least uniaxially (second stretching). After step (1-8), heat treatment [step (1-9)], crosslinking treatment by ionizing radiation [step (1-10)], hydrophilization treatment [step (1-11)] and the like may be carried out as necessary.

(1-1) Preparation of First Polyolefin Solution

A first polyolefin and a membrane-forming solvent are melt blended to prepare a first polyolefin solution. Various types of additives such as an antioxidant, ultraviolet absorber, anti-blocking agent, pigment, dye, inorganic filler, and/or pore forming agent (such as silicate fine powder) can be added to the polyolefin solution, to the extent that the effect of the present invention does not become worse.

As the membrane-forming solvent, either a liquid or solid solvent can be used, but a solvent which is liquid in room temperature is preferred. Examples of the liquid solvent include aliphatic or cyclic hydrocarbons such as nonane, decane, decalin, paraxylene, undecane, dodecane, and liquid paraffin; mineral oil distillates having boiling points comparable to those of the above hydrocarbons; and phthalate esters that are liquid at room temperature such as dibutyl phthalate and dioctyl phthalate. It is preferable to use a non-volatile liquid solvent such as liquid paraffin in order to obtain a gel-like laminated sheet having a stable liquid solvent content. Further, a solvent that is miscible with polyethylene in a melt-blended state but solid at room temperature can be used instead of the liquid solvent, or with the liquid solvent. Examples of such solid solvents include stearyl alcohol, ceryl alcohol, paraffin wax and the like.

The liquid solvent preferably has a viscosity of from 30 to 500 cSt, more preferably from 30 to 200 cSt, at 25° C. A viscosity of 30 cSt or more at 25° C. reduces forming and simplifies mixing. On the other hand, a viscosity of 500 cSt or less at 25° C. simplifies the removal of the liquid solvent.

The process of melt blending the first polyolefin solution homogeneously is preferably carried out inside a twin-screw extruder in order to prepare a highly concentrated polyolefin solution, but not specifically limited thereto. The membrane-forming solvent may be added before the start of the mixing, or may be added during the mixing in the middle of the twin-screw extruder process, but the latter is preferred. The melt blending temperature of the first polyolefin solution is preferably from the melting temperature of the first polyolefin resin+10° C. to the melting temperature of the first polyolefin resin+150° C. The melting temperature is obtained using a differential scanning calorimetry (DSC) according to JIS K 7121. Specifically, the melt blending temperature is preferably from 140 to 260° C., more preferably from 170 to 250° C.

The ratio (L/D) of the length (L) and the diameter (D) of the screw of the twin-screw extruder is preferably within the range of 20 to 100, more preferably within the range of 35 to 70. An L/D of 20 or more leads to sufficient melt blending. An L/D of 100 or less prevents an excessive increase in the residence time of the polyethylene solution. The cylinder inner diameter of the twin-screw extruder is preferably from 40 to 100 mm.

The concentration of the first polyolefin solution is preferably from 1 to 75% by weight, more preferably from 20 to 70% by weight. If the concentration of the first polyolefin solution is within this preferred range, an excellent productivity, a smaller swell and neck-in at the exit of the die upon extrusion, and an excellent moldability and self-supportability of the gel-like laminated molding are provided while improving the moldability of the gel-like laminated molding.

(1-2) Preparation of the Second Polyolefin Solution

A second polyolefin and a membrane-forming solvent are melt blended to prepare a second polyolefin solution. The membrane-forming solvent used for the second polyolefin solution may be the same as or different from the membrane-forming solvent used in the first polyolefin solution, but the same solvent is preferred. The preparation process other than the above may be the same as the preparation of the first polyolefin solution.

(1-3) Extrusion

The first and the second polyolefin solutions are supplied to one die from each of the extruders, where the both solutions are disposed in layers, and extruded in the shape of sheet. In the case of producing a multilayer microporous membrane having a structure of three layers or more, both solutions are disposed in layers and extruded in the shape of sheet such that the first polyolefin solution forms at least both surface layers, and the second polyolefin solution forms at least one layer between the both surface layers (preferably, in contact with one or both of the surface layers).

The method of extrusion may be either a flat die method or an inflation method. In both methods, a method in which each of the solutions are supplied to separate manifolds and laminated in layers at the lip entrance of a die for multilayer (multiple manifold method), or a method in which solutions are disposed in layered flow before supplying to a die (block method) can be used. Since multiple manifold method and block method are publicly known, detailed description thereof will not be provided herein. The gap of the flat die for multilayer is preferably from 0.1 to 5 mm. The extrusion temperature is preferably from 140 to 250° C., the extrusion speed is preferably from 0.2 to 15 m/minute. The ratio of the membrane thickness of the first and the second microporous layers can be controlled by adjusting the extrusion amount of each of the first and the second polyolefin solutions.

(1-4) Formation of Gel-Like Laminated Sheet

The resulting laminated extrusion molding is cooled to form a gel-like laminated sheet. Cooling is preferably carried out at a rate of 50° C./min or more, at least until the gelation temperature is reached. Cooling is preferably carried out to 40° C. or lower. The microphases of the first and the second polyolefins separated by the membrane-forming solvent can be immobilized by cooling. In general, a lower cooling rate leads to larger pseudo-cell units, resulting in a coarser higher-order structure of the resulting gel-like laminated sheet, while a higher cooling rate leads to dense cell units. If the cooling rate is within this preferred range, the crystallinity does not increase and a gel-like sheet suitable for stretching is more likely obtained. Examples of cooling methods which can be used include a method of bringing the sheet into contact with a cooling medium such as cooling air, cooling water and the like, and a method of bringing the sheet into contact with a chill roll.

(1-5) Stretching (First Stretching) of Gel-Like Laminated Sheet

The resulting gel-like laminated sheet is stretched at least uniaxially. Since the gel-like laminated sheet contains a membrane-forming solvent, it can be stretched uniformly. The gel-like laminated sheet is preferably stretched to a predetermined magnification by a tenter method, roll method, inflation method, or a combination thereof, after heating. The stretching may be uniaxial stretching or biaxial stretching, but biaxial stretching is preferred. In the case of biaxial stretching, any of simultaneous biaxial stretching, sequential stretching and multistage stretching (for example, combination of simultaneous biaxial stretching and sequential stretching) can be used, but simultaneous biaxial stretching is preferred.

In the case of uniaxial stretching, the stretching magnification is preferably 2-fold or more, more preferably 3 to 30-fold. In the case of biaxial stretching, the stretching magnification in both directions is preferably 3-fold or more (an area magnification of 9-fold or more is preferred, more preferably 16-fold or more, particularly preferably 25-fold or more). An area magnification of 9-fold or more improves the pin puncture strength. In general, an area magnification exceeding 400-fold puts restriction on stretching apparatus, stretching operation and the like.

(1-6) Removal of Membrane-Forming Solvent

A washing solvent is used to remove the membrane-forming solvent. Since the first and the second polyolefin phases are phase-separated from the membrane-forming solvent, removal of the membrane-forming solvent provides a porous membrane composed of fibrils forming a fine three-dimensional network structure, and having three-dimensionally and irregularly connected pores (voids) can be obtained. Examples of suitable washing solvents include volatile solvents such as saturated hydrocarbons such as pentane, hexane and heptane; chlorinated hydrocarbons such as methylene chloride and carbon tetrachloride; ethers such as diethyl ether and dioxane; ketones such as methyl ethyl ketone; chain fluorocarbons such as ethane trifluoride, $C_6F_{14}$ and $C_7F_{16}$; cyclic hydrofluorocarbons such as $C_5H_3F_7$; hydrofluoroethers such as $C_4F_9OCH_3$ and $C_4F_9OC_2H_5$; perfluoroethers such as $C_4F_9OCF_3$ and $C_4F_9OC_2F_5$.

Washing of the gel-laminated sheet can be carried out by a method of immersing the sheet in the washing solvent, a method of showering the washing solvent on the sheet, or a combination thereof. The washing solvent is preferably used in an amount of 300 to 30,000 parts by weight relative to 100 parts by mass of the membrane. The washing temperature may be from 15 to 30° C., and the sheet may be heat washed as necessary. The heat washing temperature is preferably 80° C. or less. The washing by the washing solvent is preferably performed until the residual amount of the liquid solvent becomes less than 1% by weight of the original amount added.

(1-7) Drying

The laminated microporous membrane after removing the membrane-forming solvent is dried by heat-drying or air drying. The drying temperature is preferably not more than the crystal dispersion temperature of the polyolefin, particularly preferably, 5° C. or more lower than the crystal dispersion temperature. The drying is preferably carried out until the residual amount of the washing solvent becomes 5% by mass or less, more preferably 3% by weight or less, relative to 100% by weight (dry weight) of the laminated microporous membrane. When dried sufficiently, the porosity of the laminated microporous membrane does not decrease when the latter-stage stretching step and the heat treatment step of the laminated microporous membrane are performed, and an excellent permeability can be obtained.

(1-8) Re-Stretching (Second Stretching) of Laminated Microporous Membrane

The laminated microporous membrane after dying is stretched at least uniaxially (re-stretching). The stretching of the laminated microporous membrane can be carried out by a tenter method or the like while heating. The stretching may be uniaxial stretching or biaxial stretching. In the case of biaxial stretching, either simultaneous biaxial stretching or sequential stretching may be performed, but simultaneous biaxial stretching is preferred. Since re-stretching is usually performed on the continuous sheet-like laminated microporous membrane obtained from the stretched gel-like laminated sheet, MD and TD in the re-stretching correspond with MD and TD in the stretching of the gel-like laminated sheet. This is true for other production methods.

The stretching temperature is preferably the crystal dispersion temperature of the polyolefin constituting the microporous membrane+20° C. or less, more preferably, the crystal dispersion temperature+15° C. or less. The lower limit of the second stretching temperature is preferably the crystal dispersion temperature of the polyolefin. A re-stretching temperature within this preferred range prevents a decrease in the compression resistance and results in a lower variation of physical properties in the width direction of the sheet when the sheet is stretched in TD. At the same time, it leads to sufficient softening of the polyolefin, and the sheet can be uniformly stretched and is less likely to rupture during stretching.

The stretching magnification of the laminated microporous membrane in uniaxial direction is preferably from 1.1 to 1.8-fold. In the case of uniaxial stretching, the stretching magnification is 1.1 to 1.8-fold in the longitudinal direction or the transverse direction. In the case of biaxial stretching, the stretching magnification is 1.1 to 1.8-fold in the longitudinal direction and the transverse direction, respectively. The magnification in the longitudinal direction and the transverse direction may be the same or different, but they are preferably the same.

(1-9) Heat Treatment

The laminated microporous membrane after drying is preferably subjected to heat treatment. The heat treatment stabilizes crystals and makes lamellas uniform. The heat treatment can be carried out by heat setting treatment and/or heat relaxing treatment. The heat setting treatment is preferably carried out by a tenter method or a roll method. The heat setting temperature is preferably within the range from the crystal dispersion temperature to the melting temperature, more preferably within the range of the stretching temperature of the laminated microporous membrane±5° C., particularly preferably, within the range of the stretching (re-stretching) temperature of the laminated microporous membrane±3° C.

The heat relaxing treatment is carried out by a tenter method, roll method, rolling method, belt conveyor method or floating method. The heat relaxing treatment is carried out at the melting temperature or lower, preferably within the temperature range of from 60° C. to (the melting temperature −5° C.). The relaxing ratio in the production process of the present invention refers to the ratio of the relaxing to be set in the heat relaxing treatment. For example, in the case of TD, it refers to the ratio of the membrane width after the heat relaxing treatment to the maximum re-stretching width.
(1-10) Crosslinking Treatment The laminated microporous membrane may be subjected to crosslinking treatment by irradiation of ionizing radiation such as alpha-rays, beta-rays, gamma-rays and electron beams. In cases where irradiation of electron beams is used, the amount of electron beams is preferably from 0.1 to 100 Mrad, and the acceleration voltage is preferably from 100 to 300 kV. The crosslinking treatment increases the meltdown temperature of the laminated microporous membrane.
(1-11) Hydrophilization Treatment The laminated microporous membrane may be subjected to hydrophilization treatment. The hydrophilization treatment can be carried out by monomer grafting, surfactant treatment, corona discharge or the like. Monomer grafting is preferably carried out after the crosslinking treatment.

In the case of surfactant treatment, any of a nonionic surfactant, a cationic surfactant, an anionic surfactant and an amphoteric surfactant can be used, but a nonionic surfactant is preferred. The laminated microporous membrane is either immersed in a solution in which a surfactant is dissolved in water or lower alcohols such as methanol, ethanol or isopropyl alcohol, or the solution is applied to the laminated microporous membrane using a doctor blade method.
(B) Second Production Method The second production method of the polyolefin multilayer microporous membrane comprises the steps of: (2-1) melt blending a first polyolefin and a membrane-forming solvent to prepare a first polyolefin solution; (2-2) melt blending a second polyolefin and a membrane-forming solvent to prepare a second polyolefin solution; (2-3) extruding the first and the second polyolefin solutions through separate dies and laminating the extrudates immediately after extrusion; (2-4) cooling the resulting laminate to form a gel-like laminated sheet; (2-5) stretching the gel-like laminated sheet; (2-6) removing the membrane-forming solvent from the gel-like laminated sheet; (2-7) drying the resulting laminated microporous membrane; and (2-8) re-stretching the laminated microporous membrane. After step (2-8), heat treatment step (2-9), crosslinking treatment step by ionizing radiation (2-10), hydrophilization treatment step (2-11) and the like may be carried out as necessary.

Since the second method is the same as the first method except for step (2-3), step (2-3) alone will be described. In step (2-3), the first and the second polyolefin solutions are extruded in the shape of sheets from contiguous dies connected to each of the multiple extruders, and laminated immediately while the temperature of each of the solutions is still high (for example, 100° C. or more). Steps other than the above may be the same as those in the first method.

(C) Third Production Method

The third production method of the polyolefin multilayer microporous membrane comprises the steps of: (3-1) melt blending a first polyolefin and a membrane-forming solvent to prepare a first polyolefin solution; (3-2) melt blending a second polyolefin and a membrane-forming solvent to prepare a second polyolefin solution; (3-3) extruding the first polyolefin solution from one die to prepare a first extrusion molding; (3-4) extruding the second polyolefin solution from a separate die to prepare a second extrusion molding; (3-5) cooling the resulting first and second extrusion moldings to form first and second gel-like sheets; (3-6) stretching the first and the second gel-like sheets separately; (3-7) laminating the stretched first and second gel-like sheets; (3-8) removing the membrane-forming solvent from the resulting gel-like laminated sheet; (3-9) drying the resulting laminated microporous membrane; and (3-10) stretching the laminated microporous membrane. A step of (3-11) stretching the gel-like laminated sheet and the like can be performed between step (3-7) and (3-8). In addition, (3-12) heat treatment step, (3-13) crosslinking treatment step by ionizing radiation, (3-14) hydrophilization treatment step and the like can be carried out after step (3-10).

Step (3-1) and (3-2) may be the same as step (1-1) and (1-2) in the first method, step (3-3) and (3-4) may be the same as step (1-3) in the first method except that the first and the second polyolefin solutions are extruded from separate dies, step (3-5) may be the same as step (1-4) in the first method except that separate gel-like sheets are formed, step (3-6) may be the same as step (1-5) in the first method except that separate gel-like sheets are stretched, and steps (3-8) to (3-10) may be the same as steps (1-6) to (1-8) in the first method. In addition, step (3-11) may be the same as step (1-5) in the first method, and steps (3-12) to (3-14) may be the same as steps (1-9) to (1-11) in the first method.

Step of laminating the stretched first and second gel-like sheets (7) will be described below. In the case of producing a multilayer microporous membrane having a structure of three layers or more, the stretched gel-like sheets are laminated such that the stretched first gel-like sheet forms at least both surface layers, and the stretched second gel-like sheet forms at least one layer between the both surface layers. The lamination method is preferably a heat lamination method, but not specifically limited thereto. Examples of the heat lamination method include a heat sealing method, impulse sealing method, ultrasound lamination method and the like. Heat sealing method is preferred. As the heat sealing method, a method using hot rolls is preferred. In the hot roll method, the first and the second gel-like sheets are passed through between a pair of hot rolls. The temperature and the pressure during heat sealing are not specifically limited, as long as the gel-like sheets are sufficiently adhered and the properties of the resulting multilayer microporous membranes are not decreased. The heat sealing temperature is from 90 to 135° C., for example, and preferably from 90 to 115° C. The heat sealing pressure is preferably from 0.01 to 50 MPa. The thickness ratio of the first and the second microporous layers can be controlled by adjusting the thickness of the first and the second gel-like sheets. Further, the sheets may be stretched during lamination by passing the sheets through between hot rolls in multiple stages.
(D) Fourth Production Method The fourth production method of the polyolefin multilayer microporous membrane comprises the steps of: (4-1) melt blending a first polyolefin and a membrane-forming solvent to prepare a first polyolefin solution; (4-2) melt blending a second polyolefin and a membrane-forming solvent to prepare a second polyolefin solution; (4-3) extruding the first polyolefin solution from one die; (4-4) extruding the second polyolefin solution from a separate die; (4-5) cooling each of the resulting extrusion moldings to form first and second gel-like sheets; (4-6) stretching the first and the second gel-like sheets separately, (4-7) removing the membrane-forming solvent from each of the stretched gel-like sheets; (4-8) drying the resulting first and second polyolefin microporous membranes; (4-9) stretching at least the second polyolefin microporous membrane; (4-10) laminating the first and the second polyolefin microporous membranes. Each of the first and the second polyolefin microporous membranes may be subjected to heat treatment step (4-11) between step (4-8) and (4-9) as necessary. In addition, stretching step (4-12), heat treatment step (4-13), crosslinking treatment step by ionizing radiation (4-14), hydrophilization treatment step (4-15) and the like of the laminated microporous membrane may be carried out after step (4-10).

Step (4-1) and (4-2) may be the same as step (1-1) and (1-2) in the first method, step (4-3) and (4-4) may be the same as step (1-3) and (1-4) in the first method except that the first and the second polyolefin solutions are extruded through separate dies, step (4-5) may be the same as step (1-4) in the first method except that separate gel-like sheets are formed, step (4-6) may be the same as step (3-6) in the third method, step (4-7) may be the same as step (1-6) in the first method except that the membrane-forming solvent is removed from each of the separate gel-like sheets, and step (4-8) may be the same as step (1-7) in the first method except that separate microporous membranes are dried. Steps (4-13) to (4-15) may be the same as steps (1-9) to (1-11) in the first method.

In step (4-9), at least the second polyolefin microporous membrane is stretched. The stretching temperature is preferably not more than the melting temperature, more preferably from the crystal dispersion temperature to the melting temperature. The first polyolefin microporous membrane may also be stretched as necessary. The stretching temperature is preferably not more than the melting temperature, more preferably from the crystal dispersion temperature to the melting temperature. In either case of stretching the first or the second polyolefin microporous membrane, the stretching magnification may be the same as in the first method except that the microporous membrane which is not laminated is stretched.

Step of laminating the stretched first polyolefin microporous membrane and the stretched second polyolefin microporous membrane (4-10) will now be described. In the case of producing a multilayer microporous membrane having a structure of three layers or more, the first and the second microporous membranes are laminated such that the first polyolefin microporous membranes forms at least both surface layers, and the second polyolefin microporous membrane forms at least one layer between the both surface layers. The lamination method is preferably a heat lamination method as in the step of laminating the gel-like sheets in the third method, particularly preferably a heat sealing method, but not specifically limited thereto. The heat sealing temperature is from 90 to 135° C., for example, and preferably from 90 to 115° C. The heat sealing pressure is preferably from 0.01 to 50 MPa. The membranes may be stretched during lamination, and examples of the method include a method in which the membranes are passed through between hot rolls in multiple stages, at the above mentioned temperature and the pressure.

In heat treatment step (4-11), the first and the second polyolefin microporous membranes are subjected to heat treatment separately. The heat setting temperature of the first microporous membrane is preferably from the crystal dispersion temperature to the melting temperature. The heat relaxing temperature of the first microporous membrane is preferably not more than the melting temperature, more preferably from 60° C. to (the melting temperature −5° C.). The heat setting temperature of the second microporous membrane is preferably from the crystal dispersion temperature to the melting temperature, more preferably the stretching temperature ±5° C., particularly preferably the stretching temperature ±3° C. The heat relaxing temperature of the second microporous membrane is preferably not more than the melting temperature, more preferably from 60° C. to (the melting temperature −5° C.).

[3] Structure of Polyolefin Multilayer Microporous Membrane (A) First Microporous Layer (1) Number of Layers The polyolefin multilayer microporous membrane of the present invention has a structure of three layers or more, with the first microporous layers forming at least both surface layers. In cases where the multilayer microporous membrane has a structure of four layers or more, the first microporous layer(s) may further be disposed between the both surface layers as necessary. For example, the polyolefin multilayer microporous membrane may have a structure of: the first microporous layer/the second microporous layer/the first microporous layer/the second microporous layer/the first microporous layer.

(2) Effect of First Microporous Layer

When both surface layers are formed by the first microporous layer, a polyolefin multilayer microporous membrane having excellent slip characteristics can be obtained.

(B) Second Microporous Layer (1) Number of Layers

The polyolefin multilayer microporous membrane of the present invention has a structure of three layers or more, with at least one layer of the second microporous layer disposed between the two first microporous layers (both surface layers). In the case of producing a multilayer microporous membrane having a structure of four layers or more, multiple layers of the second microporous layer may be disposed as necessary.

(2) Effect of Second Microporous Layer

Since the second microporous layer is not the surface layer, it has small effect on the physical properties which affect the surface characteristics (such as slip characteristics) of the membrane. However, the second microporous layer has an effect of providing an excellent balance in the overall membrane performance (such as mechanical properties, gas permeability and breakdown voltage properties of the membrane).

(C) Configuration and Ratio of First and Second Microporous Layers

The first and the second microporous layers of the polyolefin multilayer microporous membrane are disposed so as to form a structure of three layers or more in which the first microporous layers are disposed as both surface layers, and at least one second microporous layer is disposed between the both surface layers. In cases where the multilayer microporous membrane has a structure of four layers or more, one or both of the first and the second microporous layers may further be disposed in addition, as long as at least one second microporous layer is disposed between the both surface layers. In cases where a plurality of microporous layers are disposed between both surface layers, the configuration of the microporous layers between the both surface layers is not specifically limited. The polyolefin multilayer microporous membrane of the present invention preferably has a trilayer structure of: the first microporous layer/the second microporous layer/the first microporous layer, but not specifically limited thereto. In cases where the multilayer microporous membrane has a structure of four layers or more, a microporous layer(s) having different compositions from the first and the second microporous layers (the third, the fourth microporous layer(s), and so on) may be disposed between the both surface layers. In this case, the material used for the first and the second microporous layers can be used as the materials constituting the third, the fourth microporous layer(s), and so on.

In a structure of three layers or more, the ratio of the thickness of the first microporous layer (the total thickness of the first microporous layers) is preferably from 10 to 60% relative to 100% of the total thickness of the first and the second microporous layers. If the ratio of the thickness of the first microporous layer (the total thickness of the first microporous layers) is within this preferred range, sufficient slip characteristics may be provided. At the same time, durability and safety such as high breakdown voltage due to densification of micropores can be secured, because the relative thickness of the second microporous layer will not be too high. This ratio is preferably from 15 to 50%. In the case of trilayer structure, the layer thickness ratio of the first microporous layer/the second microporous layer/the first microporous layer is preferably from 0.05/0.9/0.05 to 0.3/0.4/0.3, more preferably from 0.07/0.86/0.07 to 0.25/0.5/0.25.

[3] Properties of Polyolefin Multilayer Microporous Membrane

It is important that the polyolefin multilayer microporous membrane of the present invention has a pore density calculated by the following formula of 4 or more:

Pore density=$(P/A^3) \times 10^4$ wherein A represents the average pore radius (nm) measured by mercury porosimetry method and P represents the porosity (%).

The porosity is a value obtained by the method which will be described later. The pore density is preferably 4.5 or more. A pore density of less than 4 results in a more frequent occurrence of short-circuit when a voltage is applied to both sides of the membrane, for example, leading to a lower breakdown voltage. In cases where the polyolefin multilayer microporous membrane of the present invention is used as a battery separator, an increased durability and safety can be obtained.

Furthermore, it is important that the polyolefin multilayer microporous membrane of the present invention has a static friction coefficient of one of the surface layers of the polyolefin multilayer microporous membrane against the other surface layer in longitudinal direction (MD) of 1.1 or less. The static friction coefficient is preferably 1.0 or less. A static friction coefficient of the right surface against the back surface in longitudinal direction (MD) exceeding 1.1 results in poor slip characteristics between membranes and an occurrence of static electricity due to peeling charge generated when the membrane is unwinded from a roll state, which in turn cause deterioration in operational efficiency, and quality deterioration due to workers' discomfort and adhesion of foreign substances.

The polyolefin multilayer microporous membrane of the present invention preferably has an electrochemical stability of 65 m Ah or less, more preferably, 60 mAh or less. The electrochemical stability is a value obtained by the method described later.

In the present invention, the breakdown voltage refers to a value measured by the method described in (7) in the EXAMPLES. The polyolefin multilayer microporous membrane of the present invention preferably has a breakdown voltage of 1.4 k V/11.5 μm or more. The breakdown voltage herein refers to the voltage where, when the microporous membrane is placed between a cathode and an anode and a voltage is applied stepwise to both electrodes, the number of occurrences of short-circuits counted reached 20, and it corresponds to a value measured by the method described in detail later. The breakdown voltage is preferably 1.5 kV/11.5 μm or more, more preferably, 1.6 kV/11.5 μm or more.

Further, the air permeability is preferably 250 sec/100 cc or less. The air permeability is a value obtained by the method described later. The air permeability is more preferably 200 sec/100 cc or less. The polyolefin multilayer microporous membrane of the present invention has a small membrane thickness, and it is capable of achieving an excellent pore density and breakdown voltage while maintaining a high air permeability.

[5] Battery Separator

The polyolefin multilayer microporous membrane of the present invention can be suitably used as a battery separator. Since the polyolefin multilayer microporous membrane of the present invention is used as a battery separator, its membrane thickness can be selected as appropriate depending on the types of the batteries. The polyolefin multilayer microporous membrane preferably has a membrane thickness of from 3 to 200 μm, more preferably from 5 to 50 μm, particularly preferably from 10 to 35 μm, and most preferably from 10 to 20 μm.

[6] Batteries

The polyolefin multilayer microporous membrane of the present invention can be suitably used as a separator for secondary batteries such as lithium ion secondary batteries, lithium polymer secondary batteries, nickel-metal hydride secondary batteries, nickel-cadmium secondary batteries, nickel-zinc secondary batteries and silver-zinc secondary batteries. It is particularly suitable as a separator for lithium secondary batteries. Lithium ion secondary batteries will be described below. However, the present invention is not limited to lithium ion secondary batteries.

In a lithium ion secondary battery, a cathode and an anode are laminated with a separator in between, and the separator contains an electrolytic solution (electrolyte). The structure of the electrodes is not specifically limited, and known structures can be used. For example, an electrode structure in which a disk-like cathode and anode are disposed to face one another (coin type), an electrode structure in which plate-like cathodes and anodes are stacked alternately (stacked type), and an electrode structure in which a belt-like cathode and anode that are laminated are winded (winding-type), and the like can be used.

The cathode generally has a collector, and a layer formed on the surface thereof containing a cathode active material capable of absorbing and releasing lithium ions. Examples of the cathode active material include inorganic compounds such as transition metal oxides, complex oxides of lithium and transition metals (lithium complex oxides), transition metal sulfides. Examples of transition metals include V, Mn, Fe, Co, Ni and the like. Preferred examples of the lithium complex oxide include laminar lithium complex oxides based on lithium nickelate, lithium cobaltate, lithium manganate, α-NaFeO$_2$ structure and the like. The anode generally has a collector, and a layer formed on the surface thereof containing an anode active material. Examples of the anode active material include carbonaceous materials such as natural graphite, artificial graphite, coke, carbon black and the like.

An electrolyte can be obtained by dissolving a lithium salt in an organic solvent. Examples of lithium salts include, $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, $LiN(C_2F_5SO_2)_2$, $LiPF_4(CF_3)_2$, $LiPF_3(C_2F_5)_3$, lower aliphatic lithium carboxylate, $LiAlCl_4$ and the like. Such a salt may be used alone or as a mixture of two or more thereof. Examples of the organic solvent include organic solvents having a high boiling point and a high dielectric constant such as ethylene carbonate, propylene carbonate, ethyl methyl carbonate, γ-butyrolactone; and organic solvents having a low boiling point and a low viscosity such as tetrahydrofuran, 2-methyl tetrahydrofuran, dimethoxyethane, dioxolane, dimethyl carbonate, diethyl carbonate and the like. Such a solvent may be used alone or as a mixture of two or more thereof. Since an organic solvent having a high dielectric constant has a high viscosity, and an organic solvent having a low viscosity has a low dielectric constant, a mixture of both is preferably used.

When assembling a battery, a separator is impregnated with an electrolyte. This enables to impart ion permeability to the separator (multilayer microporous membrane). The impregnation is carried out by immersing the multilayer microporous membrane in an electrolyte at ordinary temperature. In the case of assembling a cylindrical battery, for example, a cathode sheet, a separator composed of a multilayer microporous membrane, and an anode sheet are laminated in this order, winded, inserted in a battery can, and impregnated with an electrolyte, followed by caulking a battery cap with a safety valve, which also works as a cathode terminal, via a gasket.

EXAMPLES

The present invention will now be described in further detail with reference to the following Examples, but the present invention is not limited thereto. Methods for measuring the properties of the polyolefin microporous membranes in each of the Examples are as follows.

(1) Average Membrane Thickness (μm)

A sample piece of 100 mm square was cut out, and the membrane thickness of the four corners and the center of the sample were measured by a contact-type thickness gauge, and the measured values were averaged to obtain the average membrane thickness.

(2) Air Permeability (sec/100 $cm^3$)

The air permeability was measured according to JIS P 8117.

(3) Porosity (%)

Weight per unit area W (g/$cm^2$) was calculated from the mass of a 50 mm square sample. Then the porosity was calculated from the average density ρ (g/$cm^3$) (the weighted average of the density of a single component) of the membrane components and the thickness d (cm), according to the formula below. For example, when the ratio of component 1 and component 2 are represented as $y_1$ and $y_2$ ($y_1+y_2=1$), respectively, and the density of each single component is represented as ρ1 and ρ2 respectively:

Average density $ρ=y_1×ρ_1+y_2×ρ_2$

Porosity $P=(1-W/(d×ρ))×100(\%)$

The porosity is preferably from 20 to 75%, more preferably from 25 to 60%.

(4) Pin Puncture Strength (gf)

A sample piece of 100 mm square was cut out, and the maximum load of the microporous membrane, when the four corners and the center of the membrane were punctured with a needle of 1 mm diameter with a sphere tip (curvature radius R: 0.5 mm) at a speed of 2 mm/second, was measured, and then the mean value was calculated.

(5) Heat Shrinkage (%)

The shrinkage rate was obtained by measuring the changes in lengths in the longitudinal direction (MD) and the transverse direction (TD) when the microporous membrane was exposed at 105° C. for 8 hours. The formula for the calculation is as follows.

Heat shrinkage (%)=(1−(length after heating/length before heating))×100

(6) Pore Density

The pore density was obtained from the porosity P (%) as described in above (3) and the average pore radius A (nm) measured by mercury porosimetry method which will be described later, according to the formula below.

Pore density=$(P/A^3)×10^4$

The average pore radius was calculated from Vp ($cm^3$/g) which is the accumulated micropore volume measured by mercury porosimetry (apparatus employed: Poresizer Type 9320, manufactured by Micromeritic Corp.) and Sp ($m^2$/g) which is the accumulated micropore specific surface area when assuming the micropores to be cylindrical, based on the micropore radius r obtained from Vp and each pressure, according to the formula below.

Average pore radius=$2×Vp×1,000/Sp$

The average pore radius is preferably 57 nm or less, more preferably 53 nm or less.

(7) Breakdown Voltage (kV)

The breakdown voltage of the microporous membrane was evaluated according to the following method. A sample is cut into a width of 650 to 700 mm and a length of 600 mm or more, and spread on a copper plate electrode (650 mm×530 mm). The sample is then covered with a metal deposited film, and the surface of the film is stroked using a felt cloth to remove air and wrinkles A voltage is applied between the metal deposited film and the copper plate. In this case, after maintaining at 0.5 kV for 30 seconds, the voltage was elevated at a rate of 0.1 kV/10 seconds and maintained for 10 seconds at every 0.1 kV. This operation was repeated. During the operation, numbers of occurrences of short-circuit were counted at every 0.1 kV, and the measurement was terminated when the count exceeded 20. The voltage at that time point was determined as the breakdown voltage.

This operation was repeated 5 times and the mean value of the measurements was converted to the value corresponding to 11.5 μm by proportionally distributing the thickness obtained in (1), to determine the breakdown voltage of the microporous membrane.

(8) Electrochemical Stability (mAh)

The electrochemical stability of the membrane in the present invention refers to the durability against oxidative degradation when used or stored under the conditions of high temperature (about 40 to 80° C.) in battery separator applications. The specific measurement method is as described below. $LiCO_2$ was used as a cathode, graphite as an anode, and a solution in which $LiPF_6$ was dissolved in a mixed solvent of ethylene carbonate and ethylmethyl carbonate (volume ratio: 4/6) to achieve a concentration of 1 mole/L was used as an electrolyte. Then the microporous membrane was immersed in the electrolyte and a battery was assembled. This battery was maintained under the charging conditions of 4.3 V at 60° C. for 21 days. The accumulated value of the charging current supplied to the battery during the charging was represented in the unit of mAh, wherein the voltage was maintained constant during charging. When this value is small, the battery capacity loss is small, and hence the membrane has an excellent electrochemical stability.

(9) Weight Average Molecular Weight

The molecular weights of the polyethylene and polypropylene are obtained by gel permeation chromatography (GPC).

Measuring apparatus: PL-20 manufactured by Polymer Laboratories Co., Ltd.
Column: Shodex UT806M manufactured by SHOWA DENKO K.K.
Column temperature: 145° C.
Solvent (mobile phase): o-dichlorobenzene
Solvent flow rate: 1.0 mL/minute
Sample preparation: To 10 mg of sample was added 5 mL of solvent for measurement, and the mixture was heated at 140 to 150° C. for approximately 20 minutes while stirring.
Injection amount: 0.200 mL
Detector: differential refractometer RI
Standard sample: monodisperse polystyrene

(10) Static Friction Coefficient

The static friction coefficient of one of the surface layers of the above mentioned polyolefin multilayer microporous membrane of the film against the other surface in MD was measured according to ASTM D1894. The measurement was performed at a test speed of 15 cm/min.

Example 1

(1) Preparation of First Polyolefin Solution

To one hundred parts by weight of a first polyolefin composition composed of 80% by weight of high density polyethylene (HDPE) having a weight average molecular weight (Mw) of $3.0 \times 10^5$, and 20% by weight of polypropylene (PP) having a Mw of $1.2 \times 10^6$, 0.2 parts by weight of tetrakis[methylene-3-(3,5-di-tert-butyl-4-hydroxyphenyl)-propionate]methane as an antioxidant was dry blended. Into a strong kneading type twin-screw extruder (inner diameter 58 mm, L/D=52.5), 25% by weight of the resulting mixture was supplied, and 75% by weight of liquid paraffin [50 cSt (40° C.)] (resin concentration=25% by weight) was supplied via a side feeder of twin-screw extruder, followed by melt blending of the resultant under the conditions at 230° C., 250 rpm to obtain a first polyolefin solution.

(2) Preparation of Second Polyolefin Solution

To one hundred parts by weight of a second polyolefin composition composed of 40% by weight of ultra high molecular weight polyethylene (UHMWPE) having a Mw of $2.0 \times 10^6$, and 60% by weight of the above described HDPE, 0.2 parts by weight of the antioxidant described above was dry-blended. Into the same twin-screw extruder as described above, 25% by weight of the resulting mixture was supplied, and 75% by weight of the same liquid paraffin as described above (resin concentration=25% by weight) was supplied via the side feeder of twin-screw extruder, followed by melt blending of the resultant conditions at 230° C., 250 rpm to obtain a second polyolefin solution.

(3) Membrane Formation

The first and the second polyolefin solutions were supplied to a T-die for trilayer from each of the twin-screw extruders, and extruded such that the layer thickness ratio of the first polyolefin solution/second polyolefin solution/first polyolefin solution achieved 0.1/0.8/0.1. The extruded molding was cooled while drawing with a chill roll controlled at a temperature of 30° C. to obtain a gel-like trilayer sheet. The resulting gel-like trilayer sheet was simultaneously biaxially stretched (first stretching) to 5 times the original length in both the longitudinal direction and traverse direction by a tenter stretching machine at 115° C., followed by heat setting at 100° C. Then the stretched gel-like molding sheet was immersed in a washing bath of methylene chloride, and washed to remove liquid paraffin. The washed membrane was air dried, and then stretched again (second stretching) to 1.4 times the original length in TD by the tenter stretching machine while heating at 125° C., followed by 86% relaxing in the same TD. The resultant was then subjected to heat setting treatment at 125° C. while maintaining in the tenter (the total amount of time of the second stretching, relaxing and heat setting treatment was 26 seconds) to obtain a polyolefin microporous membrane.

The physical properties of the resulting microporous membrane are shown in Table 1.

Examples 2 to 9

The same operation as in Example 1 was carried out except that the composition of the first polyolefin solution, the composition of the second polyolefin solution, the temperature of the first stretching, the temperature of the second stretching, and the relaxing ratio were changed, to obtain microporous membranes. The conditions and physical properties of these membranes are summarized in Table 1.

Example 10

The same operation as in Example 1 was carried out except that 40% by weight of ultra high molecular weight polyethylene (UHMWPE) having a Mw of $2.0 \times 10^6$ and 60% by weight of HDPE having a Mw of $3.5 \times 10^5$ were used as the polyolefin composition for the second polyolefin solution, to obtain a microporous membrane.

Comparative Examples 1 to 4

The same operation as in Example 1 was carried out except that the composition of the first polyolefin solution, the composition of the second polyolefin solution, the temperature of the first stretching, the temperature of the second stretching, and the relaxing ratio were changed, to obtain microporous membranes. The conditions and physical properties of these are summarized in Table 1.

TABLE 1

|  |  | Example 1 | Example 2 | Example 3 | Example 4 | Example 5 | Example 6 | Example 7 | Example 8 |
|---|---|---|---|---|---|---|---|---|---|
| First polyolefin solution | UHMWPE | 0 | 0 | 0 | 5 | 5 | 15 | 0 | 0 |
|  | HDPE | 80 | 80 | 60 | 95 | 90 | 78 | 80 | 100 |
|  | PP | 20 | 20 | 40 | 0 | 5 | 7 | 20 | 0 |
|  | Resin concentration | 25 | 25 | 25 | 30 | 30 | 25 | 25 | 30 |

TABLE 1-continued

|  |  | | | | | | | | |
|---|---|---|---|---|---|---|---|---|---|
| Second polyolefin solution | UHMWPE | 40 | 40 | 40 | 40 | 40 | 40 | 40 | 40 |
|  | HDPE (*1) | 60 | 60 | 60 | 60 | 50 | 60 | 60 | 60 |
|  | HDPE (*2) | 0 | 0 | 0 | 0 | 0 | 0 | 0 | 0 |
|  | PP | 0 | 0 | 0 | 0 | 10 | 0 | 0 | 0 |
|  | Resin concentration | 25 | 25 | 23 | 23 | 25 | 25 | 23 | 20 |
| Temperature of First stretching (° C.) | | 115 | 115 | 119 | 115 | 117 | 117 | 115 | 116 |
| Temperature of Second stretching, Relaxing and Heat setting treatment (° | | 125 | 127 | 124 | 125 | 123 | 127 | 128 | 127 |
| Second stretching magnification in TD direction | | 1.4 | 1.4 | 1.4 | 1.4 | 1.1 | 1.4 | 1.6 | 1.4 |
| Relax ratio after second stretching (%) | | 86 | 86 | 96 | 96 | 0 | 97 | 0 | 0 |
| Membrane thickness (μ) | | 11.5 | 11.5 | 11.0 | 11.5 | 11.0 | 11.5 | 11.5 | 11.0 |
| Air permeability (sec/100 cc) | | 135 | 180 | 130 | 110 | 140 | 110 | 145 | 110 |
| Porosity (%) | | 46 | 41 | 47 | 45 | 44 | 46 | 46 | 44 |
| Pin puncture strength (gf) | | 330 | 350 | 300 | 330 | 330 | 330 | 370 | 270 |
| Heat shrinkage ratio (%) | MD | 6.0 | 4.0 | 7.5 | 5.0 | 4.0 | 5.0 | 5.0 | 3.5 |
|  | TD | 2.0 | 1.0 | 8.5 | 4.5 | 3.5 | 4.5 | 5.0 | 5.0 |
| Tensile strength (kgf/cm$^2$) | MD | 1,150 | 1,250 | 950 | 1,150 | 1,100 | 1,150 | 1,200 | 900 |
|  | TD | 1,300 | 1,450 | 1,000 | 1,400 | 1,350 | 1,400 | 1,750 | 1,250 |
| Static friction coefficient | | 0.90 | 0.90 | 0.85 | 1.00 | 0.95 | 0.95 | 1.00 | 0.95 |
| Pore density | | 5.3 | 5.6 | 5.0 | 5.4 | 4.9 | 5.4 | 4.8 | 5.0 |
| Breakdown Voltage (kV/11.5 μm) | | 1.7 | 1.8 | 1.5 | 1.6 | 1.6 | 1.6 | 1.6 | 1.5 |
| Electrochemical stability (mAh) | | 50 | 55 | 35 | 85 | 65 | 60 | 50 | 95 |

|  |  | Example 9 | Example 10 | Comparative Example 1 | Comparative Example 2 | Comparative Example 3 | Comparative Example 4 |
|---|---|---|---|---|---|---|---|
| First polyolefin solution | UHMWPE | 0 | 0 | 0 | 0 | 20 | 30 |
|  | HDPE | 100 | 100 | 80 | 100 | 78 | 70 |
|  | PP | 0 | 0 | 20 | 0 | 2 | 0 |
|  | Resin concentration | 30 | 30 | 25 | 30 | 30 | 25 |
| Second polyolefin solution | UHMWPE | 40 | 40 | 30 | 30 | 40 | 40 |
|  | HDPE (*1) | 60 | 0 | 70 | 0 | 60 | 60 |
|  | HDPE (*2) | 0 | 60 | 0 | 70 | 0 | 0 |
|  | PP | 0 | 0 | 0 | 0 | 0 | 0 |
|  | Resin concentration | 23 | 20 | 25 | 25 | 25 | 25 |
| Temperature of First stretching (° C.) | | 117 | 116 | 115 | 116 | 116 | 115 |
| Temperature of Second stretching, Relaxing and Heat setting treatment (° | | 128 | 125 | 125 | 125 | 126 | 126 |
| Second stretching magnification in TD direction | | 1.4 | 1.4 | 1.4 | 1.4 | 1.4 | 1.4 |
| Relax ratio after second stretching (%) | | 96 | 86 | 86 | 86 | 96 | 96 |
| Membrane thickness (μ) | | 11.5 | 11.5 | 11.5 | 11.5 | 11.5 | 11.5 |
| Air permeability (sec/100 cc) | | 120 | 110 | 115 | 115 | 115 | 120 |
| Porosity (%) | | 44 | 43 | 43 | 45 | 44 | 44 |
| Pin puncture strength (gf) | | 320 | 240 | 320 | 270 | 320 | 330 |
| Heat shrinkage ratio (%) | MD | 4.5 | 4.0 | 4.0 | 6.0 | 4.0 | 4.0 |
|  | TD | 4.0 | 1.0 | 4.0 | 1.5 | 4.0 | 4.0 |
| Tensile strength (kgf/cm$^2$) | MD | 1,250 | 900 | 1,200 | 1,000 | 1,200 | 1,250 |
|  | TD | 1,450 | 1,000 | 1,450 | 1,150 | 1,450 | 1.5 |
| Static friction coefficient | | 1.00 | 1.00 | 0.80 | 1.00 | 1.30 | 1.50 |
| Pore density | | 5.4 | 5.7 | 3.5 | 3.6 | 5.2 | 5.0 |
| Breakdown Voltage (kV/11.5 μm) | | 1.5 | 1.6 | 1.2 | 1.2 | 1.5 | 1.5 |
| Electrochemical stability (mAh) | | 100 | 95 | 55 | 100 | 80 | 75 |

(*1): Mw = 3.0 × 10$^5$
(*2): Mw = 3.5 × 10$^5$

As shown in Table 1, the polyolefin multilayer microporous membrane of the present invention has good slip characteristics between membranes and has a dense microporous structure, and is suitable as a separator for batteries.

INDUSTRIAL APPLICABILITY

The polyolefin multilayer microporous membrane of the present invention has good slip characteristics between membranes due to a static friction coefficient of not more than a specific value and a high durability due to a fine dense microporous structure. When the polyolefin multilayer microporous membrane of the present invention is used as a battery separator, a battery having an excellent handleability in battery production facilities, an improved quality, and an excellent safety and durability can be obtained.

The invention claimed is:

1. A polyolefin multilayer microporous membrane comprising:
at least first microporous layers which form both surface layers of the membrane and at least a second microporous layer disposed between said both surface layers, wherein static friction coefficient of one of said surface layers of said polyolefin multilayer microporous membrane against another surface layer in a longitudinal direction (MD) is 1.1 or less, and wherein pore density calculated from an average pore radius measured by mercury porosimetry method and porosity, according to Formula (1) is 4 or more:

$$\text{pore density} = (P/A^3) \times 10^4 \quad (1)$$

wherein A represents the average pore radius (nm) measured by mercury porosimetry method and P represents the porosity (%), the composition of the first microporous layer and the composition of the second microporous layer are different from each other, and the layer thickness ratio of the first microporous layer/the second microporous layer/the first microporous layer is from 0.05/0.9/0.05 to 0.3/0.4/0.3, said second microporous layer contains 35% by weight or more of ultra high molecular weight polyethylene having a Mw of $1\times10^6$ or more, and said first microporous layers contain 5% to 30% by weight of polypropylene.

2. The polyolefin multilayer microporous membrane of claim 1, having a breakdown voltage of 1.4 kV/11.5 μm or more, and an air permeability of 250 seconds/100 cc or less.

3. The polyolefin multilayer microporous membrane of claim 2, having an electrochemical stability of 65 mAh or less.

4. The polyolefin multilayer microporous membrane of claim 2, wherein said first microporous layers contain 10% by weight or less of ultra high molecular weight polyethylene.

5. The polyolefin multilayer microporous membrane of claim 1, wherein said first microporous layers contain 10% by weight or less of ultra high molecular weight polyethylene.

6. The polyolefin multilayer microporous membrane of claim 1, wherein the first microporous layers contain 5% to 20% by weight of polypropylene.

* * * * *